US009081468B2

(12) United States Patent
Lansford et al.

(10) Patent No.: US 9,081,468 B2
(45) Date of Patent: Jul. 14, 2015

(54) INTEGRATED USER PARTICIPATION PROFILES

(71) Applicant: Offerpop Corporation, New York, NY (US)

(72) Inventors: Wendell Lansford, New York, NY (US); Prakash Mishra, Stamford, CT (US)

(73) Assignee: Offerpop Corporation, New York, NY (US)

( * ) Notice: Subject to any disclaimer, the term of this patent is extended or adjusted under 35 U.S.C. 154(b) by 271 days.

(21) Appl. No.: 13/684,273

(22) Filed: Nov. 23, 2012

(65) Prior Publication Data

US 2013/0132863 A1    May 23, 2013

Related U.S. Application Data

(60) Provisional application No. 61/563,389, filed on Nov. 23, 2011.

(51) Int. Cl.
| | |
|---|---|
| *G06F 3/00* | (2006.01) |
| *G06F 3/048* | (2013.01) |
| *G06Q 30/02* | (2012.01) |
| *G06Q 50/00* | (2012.01) |

(52) U.S. Cl.
CPC ............... *G06F 3/048* (2013.01); *G06Q 30/02* (2013.01); *G06Q 50/01* (2013.01)

(58) Field of Classification Search
CPC .............................. H04L 67/306; G06F 3/048
USPC .................................................. 715/753, 760
See application file for complete search history.

(56) References Cited

U.S. PATENT DOCUMENTS

| | | | |
|---|---|---|---|
| 6,271,840 B1 | 8/2001 | Finseth | |
| 6,389,460 B1 | 5/2002 | Stewart | |
| 6,401,077 B1 | 6/2002 | Godden | |
| 6,456,305 B1 | 9/2002 | Qureshi | |
| 6,848,075 B1 | 1/2005 | Becker | |
| 6,864,904 B1 | 3/2005 | Ran | |
| 7,185,284 B2 | 2/2007 | Teng | |
| 7,363,291 B1 | 4/2008 | Page | |
| 7,617,294 B1 | 11/2009 | Harding | |
| 7,870,253 B2 | 1/2011 | Muilenburg | |
| 8,051,370 B2 | 11/2011 | Anders, Jr. | |

(Continued)

OTHER PUBLICATIONS

Phelps et al., Robust Huyperlinks Cost Just Five Words Each, Google 2000, pp. 1-12.

(Continued)

*Primary Examiner* — William Titcomb
(74) *Attorney, Agent, or Firm* — Robert Plotkin, P.C.

(57) ABSTRACT

A computer-based system identifies, measures, and rewards user interaction with online content, such as customer interaction with online content posted by companies about their products and services. The system tracks user activity online, such as user activity on online social networking systems and on web sites. For each user and company, the system generates a profile that contains data representing the user's interaction with the company's online content. The system may use such profiles to search for users who are similar to a particular user, to drive social gesture advertising to amplify the actions of users, to highlight particular users for other users to discover and connect with, and to deliver targeted promotions and to incent online engagement by users.

34 Claims, 3 Drawing Sheets

(56) References Cited

U.S. PATENT DOCUMENTS

| | | | |
|---|---|---|---|
| 8,064,727 B2 | 11/2011 | Lueck | |
| 8,161,069 B1 | 4/2012 | Wilder | |
| 8,234,193 B2 | 7/2012 | Ransom | |
| 8,417,723 B1* | 4/2013 | Lissack et al. | 707/781 |
| 8,521,857 B2* | 8/2013 | Maxwell et al. | 709/223 |
| 2006/0235941 A1 | 10/2006 | Arcas | |
| 2006/0242139 A1 | 10/2006 | Butterfield | |
| 2007/0143283 A1 | 6/2007 | Spencer | |
| 2007/0198716 A1 | 8/2007 | Knowles | |
| 2007/0255747 A1 | 11/2007 | Lee | |
| 2007/0266097 A1 | 11/2007 | Harik | |
| 2008/0005072 A1 | 1/2008 | Meek | |
| 2008/0052348 A1* | 2/2008 | Adler et al. | 709/203 |
| 2009/0119167 A1 | 5/2009 | Kendall | |
| 2009/0172560 A1 | 7/2009 | Cole | |
| 2009/0222322 A1 | 9/2009 | Andersen | |
| 2009/0222348 A1 | 9/2009 | Ransom | |
| 2009/0254529 A1* | 10/2009 | Goldentouch | 707/3 |
| 2009/0271289 A1 | 10/2009 | Klinger | |
| 2009/0287559 A1* | 11/2009 | Chen et al. | 705/14.23 |
| 2009/0313304 A1 | 12/2009 | Goodger | |
| 2009/0327078 A1 | 12/2009 | Ohazama | |
| 2010/0002096 A1 | 1/2010 | Hong | |
| 2010/0004975 A1 | 1/2010 | White | |
| 2010/0042487 A1* | 2/2010 | Barazani | 705/14.13 |
| 2010/0057840 A1 | 3/2010 | Schlusser | |
| 2010/0064234 A1 | 3/2010 | Schreiber | |
| 2010/0100800 A1 | 4/2010 | Cote | |
| 2010/0145924 A1 | 6/2010 | Zabramski | |
| 2010/0153848 A1 | 6/2010 | Saha | |
| 2010/0223119 A1 | 9/2010 | Klish | |
| 2010/0228617 A1 | 9/2010 | Ransom | |
| 2010/0268584 A1* | 10/2010 | Pullur et al. | 705/14.16 |
| 2010/0281353 A1 | 11/2010 | Rubin | |
| 2010/0306249 A1 | 12/2010 | Hill | |
| 2010/0332330 A1 | 12/2010 | Goel | |
| 2010/0332993 A1 | 12/2010 | Bousseton | |
| 2011/0047013 A1 | 2/2011 | McKenzie, III | |
| 2011/0060994 A1* | 3/2011 | Maxwell et al. | 715/730 |
| 2011/0078232 A1 | 3/2011 | Vandendriessche | |
| 2011/0126122 A1 | 5/2011 | Forman | |
| 2011/0131478 A1 | 6/2011 | Tock | |
| 2011/0153412 A1 | 6/2011 | Novikov | |
| 2011/0258050 A1 | 10/2011 | Chan | |
| 2011/0270959 A1 | 11/2011 | Schlusser | |
| 2011/0282735 A1 | 11/2011 | Kordis | |
| 2011/0282860 A1* | 11/2011 | Baarman et al. | 707/709 |
| 2012/0010995 A1 | 1/2012 | Skirpa | |
| 2012/0030553 A1 | 2/2012 | Delpha | |
| 2012/0047028 A1 | 2/2012 | Edman | |
| 2012/0054115 A1 | 3/2012 | Baird-Smith | |
| 2012/0109836 A1 | 5/2012 | Chen | |
| 2012/0136704 A1 | 5/2012 | Carlson | |
| 2012/0151322 A1 | 6/2012 | Lindsay | |
| 2012/0191715 A1 | 7/2012 | Ruffner | |
| 2012/0191776 A1* | 7/2012 | Ruffner et al. | 709/204 |
| 2012/0197980 A1 | 8/2012 | Terleski | |
| 2012/0210205 A1 | 8/2012 | Sherwood | |
| 2012/0210247 A1 | 8/2012 | Khouri | |
| 2012/0232998 A1 | 9/2012 | Schoen | |
| 2013/0019152 A1 | 1/2013 | Rau | |
| 2013/0055089 A1 | 2/2013 | Gundotra | |
| 2013/0055402 A1* | 2/2013 | Amit et al. | 726/25 |
| 2013/0115911 A1 | 5/2013 | Vishwanathan | |
| 2013/0124621 A1 | 5/2013 | Lepeska | |
| 2013/0132854 A1 | 5/2013 | Raleigh | |
| 2013/0174037 A1 | 7/2013 | Gao | |
| 2013/0179262 A1 | 7/2013 | Iwasaki | |
| 2013/0246903 A1* | 9/2013 | Mukai | 715/234 |
| 2013/0254643 A1 | 9/2013 | Goldman | |
| 2013/0282839 A1 | 10/2013 | Alcala | |
| 2013/0290821 A1 | 10/2013 | Pollack | |
| 2014/0115095 A1* | 4/2014 | Kobyakov et al. | 709/217 |

OTHER PUBLICATIONS

Wilde et al., Fragment Identifiers for Plain Text Files, ACM 2005, pp. 211-213.

"Like Button—Facebook Developers," downloaded Apr. 18, 2012, 4 pp. Available at: http://developers.facebook.com/docs/reference/plugins/like/.

"Open Graph Protocol—Facebook Developers," downloaded Jan. 9, 2012, 7 pp. Available at: http://developers.facebook.com/docs/opengraph/.

"Powerfully Simple Facebook Applications—North Social," downloaded Jan. 18, 2012, 4 pp. Available at: http://northsocial.com/apps/fan-offer/.

"Powerfully Simple Facebook Applications—North Social," downloaded Jan. 9, 2012, 14 pp. Available at: http://northsocial.com.

"Sharing Widget, Sharing Button, Sharing Plugin—ShareThis New! Share . . . ," downloaded Jan. 18, 2012, 26 pp. Available at: http://sharethis.com/publishers/new-share-widget.

Wang et al., "Extending the WiKi Paradigm for Use in the Classroom," IEEE 2004, pp. 1-5.

Tim Ware, 3 Social Plugins for Customizing Facebook iFrame Tabs, Jun. 21, 2011.

* cited by examiner

INTEGRATED USER PARTICIPATION PROFILES

CROSS-REFERENCE TO RELATED APPLICATIONS

This application claims priority from U.S. Provisional Patent Application Ser. No. 61/563,389, filed on Nov. 23, 2011, entitled, "Integrated User Participation Profiles," which is hereby incorporated by reference herein.

BACKGROUND

Users of online social networking systems often use those systems to share online content with other users. For example, a company with a Facebook page may post an announcement of a new product on that page. A user who reads the announcement may share the announcement with other users, such as by posting a link on the user's Facebook page to the product announcement. As another example, a user who sees a product announcement on a particular web page on a company's web site (rather than on the company's Facebook page) may click a Facebook "like" button on that web page. This is an example of an "endorsement" interaction by the user with the product announcement. The number of users who have "liked" or otherwise endorsed the product may be reflected within Facebook by a counter that represents the number of users who have "liked" or otherwise endorsed the product.

Such existing mechanisms for enabling users to interact with content on online social networking systems, and for tracking such user interactions, are relatively primitive and provide companies with only very limited information about the quantity and quality of user interactions with the companies' online content. What is needed, therefore, are improved techniques for tracking the quantity and quality of user interaction with online content.

SUMMARY

A computer-based system identifies, measures, and rewards user interaction with online content, such as customer interaction with online content posted by companies about their products and services. The system tracks user activity online, such as user activity on online social networking systems and on web sites. For each user and company, the system generates a profile that contains data representing the user's interaction with the company's online content. The system may use such profiles to search for users who are similar to a particular user, to drive social gesture advertising to amplify the actions of users, to highlight particular users for other users to discover and connect with, and to deliver targeted promotions and to incent online engagement by users.

For example, one aspect of the present invention is directed to a method performed by a computer processor executing computer program instructions stored on a non-transitory computer-readable medium, the method comprising: (A) identifying a first interaction by a first user with a first content element on a first web site associated with a first entity; (B) identifying a second interaction by the first user with a second content element on a first social networking site associated with the first entity; and (C) storing, in a profile associated with the first user and the first entity, a first record of the first interaction and a second record of the second interaction.

Another aspect of the present invention is directed to a method performed by a computer processor executing computer program instructions stored on a non-transitory computer-readable medium, the method comprising: (A) identifying a first interaction by a first user with a first content element on a first social networking site associated with a first entity; (B) identifying a second interaction by the first user with a second content element on a second social networking site associated with the first entity; and (C) storing, in a profile associated with the first user and the first entity, a first record of the first interaction and a second record of the second interaction.

Yet another aspect of the present invention is directed to a method performed by a computer processor executing computer program instructions stored on a non-transitory computer-readable medium, the method comprising: (A) identifying a first interaction by a first user with an online content element on a first web site associated with a first entity; (B) identifying a second interaction by the first user with an offline second content element associated with the first entity; and (C) storing, in a profile associated with the first user and the first entity, a first record of the first interaction and a second record of the second interaction.

Other features and advantages of various aspects and embodiments of the present invention will become apparent from the following description and from the claims.

DETAILED DESCRIPTION

A computer-based system identifies, measures, and rewards user interaction with online content, such as customer interaction with online content posted by companies about their products and services. The system tracks user activity online, such as user activity on online social networking systems and on web sites. For each user and company, the system generates a profile that contains data representing the user's interaction with the company's online content. The system may use such profiles to search for users who are similar to a particular user, to drive social gesture advertising to amplify the actions of users, to highlight particular users for other users to discover and connect with, and to deliver targeted promotions and to incent online engagement by users.

Figure 1:
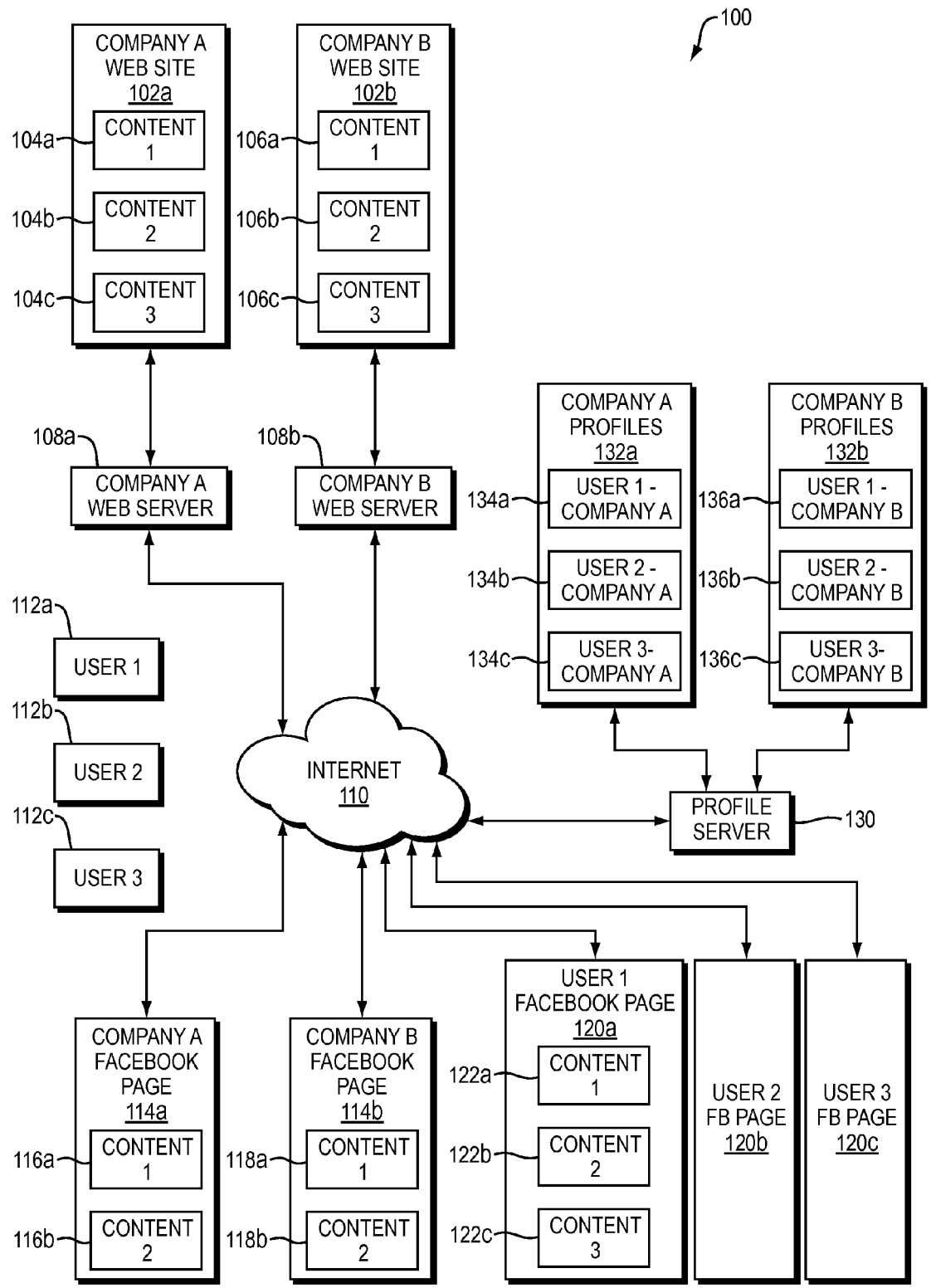
FIG. 1 is a dataflow diagram of a system for tracking user participation across multiple sites associated with a company according to one embodiment of the present invention.

Referring to FIG. 1, a diagram is shown of a system 100 implemented according to one embodiment of the present invention. The system 100 includes a plurality of web sites 102a-b. Although only two web sites 102a-b are shown in FIG. 1 for ease of illustration, the system 100 may include any number of web sites. Furthermore, although web site 102a is illustrated as being associated with a first company ("Company A") and web site 102b is illustrated as being associated with a second company ("Company B"), this is merely an example. Web sites 102a and 102b may, for example, be owned by, hosted by, or otherwise be associated with the same company. For example, web site 102a may be a web site associated with a first product or service of a company, and web site 102*b* may be a web site associated with a second product or service of the same company.

Furthermore, any reference herein to a "company" (such as Company A or Company B) should be understood to refer more generally to any entity, such as a for-profit organization, a non-profit organization, an individual person, or a brand of any of the foregoing. In FIG. 1, therefore, Company A and Company B may refer to any two entities, whether or not companies.

Furthermore, although elements 102*a* and 102*b* are labeled as "web sites" in FIG. 1, this is merely an example and does not constitute a limitation of the present invention. As another example, content elements 102*a* and 102*b* may be different subsets of the same web site. As yet another example, content elements 102*a* and 102*b* may be any form of content that is accessible over the Internet 110 or other computer network. In general, elements 102*a* and 102*b* may be any content elements that are separately addressable, such as content elements accessible via different addresses (e.g., URLs), located at different domains or sub-domains, or served by different servers. For ease of explanation, however, content elements 102*a* and 102*b* will be described herein as "web sites."

Web sites 102*a* and 102*b* contain a variety of content elements. In the particular example of FIG. 1, web site 102*a* contains content elements 104*a*, 104*b*, and 104*c*, and web site 102*b* contains content elements 106*a*, 106*b*, and 106*c*. More generally, each of web sites 102*a* and 102*b* may contain any number of elements of content. Each of the content elements 104*a-c* and 106*a-c* may, for example, be a web page or a subset of a web page.

For example, content element 104*a* may be a web page associated with a first product of Company A, content element 104*b* may be a web page associated with a second product of Company A, and content element 104*c* may be a web page associated with a third product of Company A. Similarly, for example, content 106*a* may be a web page associated with a first product of Company B, content 106*b* may be a web page associated with a second product of Company B, and content 106*c* may be a web page associated with a third product of Company B. Contents 104*a-c* and 106*a-c* may, for example, include descriptions of, advertisements for, and offers relating to their respective products.

Both online content and offline content are examples of "content," as that term is used herein. A "content element," as that term is used herein, refers to content that is specified by a corresponding content element specification. For example, a URL of a web page is an example of a content element specification that specifies the web page content that is located at the URL, in which case such web page content is an example of a content element. As another example, a filename is an example of a content element specification that specifies the file having that filename, in which case such a file is an example of a content element.

Content element specifications may specify content elements at any level of abstraction. As a result, a single content element specification may specify multiple content elements. For example, a content element specification may be treated as a query which may specify all content elements that satisfy the query. For example, a content element that includes wildcards, such as "advertisement*.html" may specify a plurality of HTML files having filenames that begin with "advertisement" and that end with ".html", in which case all such file are examples of content elements specified by the content element specification "advertisement*.html". As another example, the text "Sale" may be treated as a content element specification that specifies all documents, Twitter posts, or other content elements containing the word "sale."

As yet further examples, a content element specification may specify a particular advertisement on a particular site (e.g., a particular web site or a particular social networking site). Such a content element specification may, for example, take the form of a URL of the particular advertisement on the particular site. In this case, the particular advertisement on the particular site is the sole content element specified by the content element specification.

As another example, a content element specification may specify a particular advertisement independently of the site on which it appears. For example, consider a case in which a particular advertisement is contained within a company's web site (e.g., Company A's web site 102*a*) and within the same company's social networking site (e.g., the Company A's Facebook page 114*a*). Each instance of the advertisement (e.g., the instance of the advertisement on the company's web site and the instance of the advertisement on the company's social networking site) may contain or otherwise be associated with the same unique cross-site identifier of the particular advertisement. In this case, a content element specification may include this unique cross-site identifier of the particular advertisement. As a result, such a content element specification may specify multiple content elements, possibly on multiple sites, such as the instance of the advertisement on the company's web site and the instance of the advertisement on the company's social networking site. Note that the contents of the multiple instances of the advertisement may be the same as or differ from each other, so long as they are all associated with the same cross-site identifier.

As yet another example, a content element specification may specify a particular product, independently of the site on which content related to the product appears (where the term "product" as used herein may refer to a product and/or service, or to a brand of products and/or services). For example, consider a case in which a particular product is advertised by:
  a first instance of a first advertisement on a company's web site (e.g., content 104*a* on Company A's web site 102*a*);
  a second instance of the first advertisement on the company's social networking site (e.g., content element 116*a* on Company A's Facebook page 114*a*);
  a first instance of a second advertisement on the company's web site (e.g., content 104*b* on Company A's web site 102*a*); and
  a second instance of the second advertisement on the company's social networking site (e.g., content element 116*b* on Company A's Facebook page 114*a*);

Each such instance of the two advertisements for the same product may contain or otherwise be associated with the same unique product identifier of the product. In this case, a content element specification may include this unique product identifier. As a result, such a content element specification may specify multiple content elements, possibly on multiple sites, such as the four advertisement instances listed above. Note that the contents of the multiple instances of the advertisement may be the same as or differ from each other, so long as they are all associated with the same product identifier. Note further that the first and second instances of the first advertisement may be associated with a first cross-site identifier, and that the first and second instances of the second advertisement may be associated with a second cross-site identifier.

As another example, a content element specification may specify a particular company. Each content element associated with the company, such as each content element associated with any of the company's products and/or advertisements, may contain or otherwise be associated with the same unique company identifier of the particular company. In this case, a content element specification may include this unique company identifier. As a result, such a content element specification may specify multiple content elements, possibly on multiple sites, and possibly associated with multiple products and/or advertisements.

Certain examples above refer to advertisements as examples of content elements. It should be understood that such examples are equally applicable to types of content elements other than advertisements, such as offers, polls, quizzes, and articles. A content element specification may specify content of any one or more of such content element types.

"Content," as that term is used herein, may include online content and/or offline content. Examples of online content elements include web pages, email messages, and text messages. Examples of offline content elements include, for example, offline content elements with which a user may interact. For example, a bar code, Quick Response code (QR code), or other printed code is an example of a "content element" as that term is used herein. A user may, for example, use a bar code reader, QR code reader, and/or digital camera to capture an image of such a code. Such image capture is an example of an "interaction" of the user with the code, as that term is used herein. In this example, the company associated with the code (or other offline content with which the user interacts) may be identified, and a record of the user's interaction with the content element may be recorded in the corresponding user-company profile.

As another example, a user may print out a bar code, where the bar code encodes information sufficient to identify a particular user-company profile that is associated with the user and with a particular company, such as a unique identifier of the user-company profile. The user may then visit a point of sale and redeem the coupon in connection with the purchase of a particular product. Such a purchase is an example of an "interaction" of the user with the coupon, as that term is used herein. A device at the point of sale may scan the printed bar code. As a result, the user-company profile associated with the bar code may be identified, and a record of the user's purchase at the point of sale may be stored in the user-company profile.

As another example, a user may associate a loyalty card with one of the user's user-company profiles associated with a particular company. The association of the loyalty card with the user-company profile may be accomplished in any of a variety of ways. For example, a unique identifier may be printed on the loyalty card. The user may log into an account associated with the user-company profile and type in or otherwise input the loyalty card's unique identifier, thereby causing the unique identifier to be stored in association with the user-company profile. Any subsequent transactions in which the user engages with the loyalty card, such as purchasing a product and using the loyalty card in connection with the purchase, are examples of "interactions" with the card, as that term is used herein. When the user makes such a purchase, the unique identifier of the loyalty card may be used to identify the user-company profile associated with the loyalty card, and a record of the purchase may then be stored in association with the user-company profile.

More generally, once a user-company profile has been created for a particular user-company pair, a unique identifier of the user-company profile, or other information sufficient to identify the user-company profile, may be encoded into offline content. When the user subsequently engages in an interaction with the offline content, the user-company identifier encoded in the offline content may be read from the offline content. The user-company profile associated with the user-company identifier may be identified based on the user-company identifier. Information about the interaction may be stored in association with (e.g., within) the identified user-company profile. In this way, information about interactions of the user with offline content may be stored in association with the user's user-company profiles.

Contents 104a-c and 106a-c may be interactive in any of a variety of ways. For example, a user may click on or otherwise select a product description in content element 104a, in response to which the user's web browser may display other content (not shown in FIG. 1) related to the product. As another example, a user may click on or otherwise select a product offer in content element 104a, in response to which the user may be provided with the opportunity to accept the offer. These and other forms of user interaction with web sites 102a-b may be mediated by web servers 108a-b, respectively. As is well-known to those having ordinary skill in the art, users 112a-c may interact with web sites 102a-b by providing input to communication devices (not shown), such as any desktop or laptop computer, smartphone, personal digital assistant, or tablet computer, which communicate with web servers 108a-b over the Internet 110 or other network.

As described above, web site 102a is associated with Company A. A company may be "associated" with a web site in any of a variety of ways. For example, a company may be "associated with" a web site by owning, hosting, or otherwise providing content for use on the web site. As another example, a company may be "associated with" a web site if the web site describes the company's products and/or services. For example, in FIG. 1, web site 102a may be associated with Company A in the sense that contents 104a-c describe products of Company A, and web site 102b may be associated with Company B in the sense that contents 106a-c describe products of Company B.

A company that is associated with a web site may also be associated with content on an online social networking system, such as Facebook or Twitter. For example, in the system 100 of FIG. 1, Company A (the company that is associated with web site 102a) is also associated with a Facebook page 114a, which contains content element 116a and content element 116b. Similarly, Company B (the company that is associated with web site 102b) is also associated with a Facebook page 114b, which contains content 118a and content 118b. Although only two Facebook pages 114a-b are shown in FIG. 1 for ease of illustration, the system 100 may include any number of Facebook pages. Furthermore, Facebook is used merely as an example of an online social networking system in FIG. 1. More generally, a company may be associated with any number of online social networks (e.g., zero, one, two, or more). Similarly, the particular number of contents 116a-b and 118a-b shown in FIG. 1 is merely an example and not a limitation of the present invention.

Furthermore, although elements 114a-b are labeled as "pages" in FIG. 1, this is merely an example and does not constitute a limitation of the present invention. As another example, elements 114a and 114b may be different subsets of the same Facebook page. As yet another example, elements 114a and 114b may be any form of content contained within Facebook or another online social networking system. For ease of explanation, however, elements 114a and 114b will be described herein as "Facebook pages."

Furthermore, elements 114a and 114b may be referred to herein as "sites." In particular, element 114a may be referred to herein as a "site" associated with Company A, and element 114b may be referred to as a "site" associated with Company B. In practice, element 114a may, for example, be an account of Company A on a social networking site, such as Facebook, that contains or otherwise hosts multiple accounts, including both the account 114*a* of Company A and accounts of other companies (such as account 114*b*) of Company B. Element 114*a* may nonetheless be referred to herein as a "site" associated with Company A, and element 114*b* may nonetheless be referred to herein as a "site" associated with Company B, even in cases in which elements 114*a* and 114*b* are implemented as accounts within other sites.

A company's web site and its social networking account (e.g., its Facebook page) may be distinct from each other in any of a variety of ways. For example, a company's web site may be: (1) served by a different server than the company's social networking account; (2) accessible via a different address (e.g., URL) than the company's social networking account; or (3) accessible programmatically via a different application program interface (API) than the company's social networking account. Furthermore, a single company may have multiple social networking accounts, all of which may be distinct from each other (and from the company's web site) in any of the ways just listed, for example.

Facebook pages 114*a* and 114*b* contain a variety of content. In the particular example of FIG. 1, page 114*a* contains content element 116*a* and 116*b*, and page 114*b* contains content 118*a* and 118*b*. More generally, each of pages 114*a* and 114*b* may contain any number of elements of content. Each of the contents 116*a-b* and 118*a-b* may, for example, be content representing a description of a product, an advertisement for a product, or an offer for a product.

For example, content element 116*a* may be an offer for a first product of Company A (e.g., the same product as that offered by content element 104*a*) and content element 116*b* may be an offer for a second product of Company A (e.g., the same product as that offered by content element 104*b*). Similarly, for example, content 118*a* may be an offer for a first product of Company B and content 118*b* may be an offer for a second product of Company B.

As is well-known to those having ordinary skill in the art, users 112*a-c* may interact with Facebook pages 114*a-b* by providing input to communication devices (not shown), such as any desktop or laptop computer, smartphone, personal digital assistant, or tablet computer, which communicate with a Facebook server 120 over the Internet 110 or other network. The Facebook server 120 processes input from the users 112*a-c* and provides output to the users 112*a-c* to provide the functionality of the Facebook pages 114*a-b* to the users 112*a-c*.

One or more of users 112*a-c* may have their own Facebook pages. In the example of FIG. 100, all three users 112*a-c* have their own corresponding Facebook pages 120*a-c*, respectively. In general, however, embodiments of the present invention do not require that all users have their own Facebook pages. For example, users 112*a* and 112*b* may have Facebook pages, but user 112*c* may not have a Facebook page.

Furthermore, although not shown in FIG. 1, a user may have pages (referred to herein more generally as "accounts") on more than one online social networking system. For example, user 112*a* may have both an account on Facebook (e.g., page 120*a*) and an account on Twitter. As another example, user 112*b* may have both an account on Facebook (e.g., page 120*b*) and an account on LinkedIn. Embodiments of the present invention may track the activity of a single user across all of the user's online social networking accounts. For example, embodiments of the present invention may track the activity of user 112*a* in connection with Company A across all of user 112*a*'s online social networking accounts.

Users 112*a-c* may interact with content on web site 102*a* (e.g., contents 104*a-c*), web site 102*b* (e.g., contents 106*a-c*), Facebook page 114*a* (e.g., contents 116*a-b*), and Facebook page 114*b* (e.g., contents 118*a-b*) in a variety of ways. Examples of such interaction include, but are not limited to, the following:

- If user 112*a* reads a description of one of Company A's products within content element 104*a* on Company A's web site 102*a*, the user 112*a* may share content element 104*a* with other users, such as by posting a link 122*a* to the content element 104*a* within user 112*a*'s Facebook page 120*a*.
- If user 112*a* reads a description of one of Company A's products within content element 104*a* on Company A's web site 102*a*, the user 112*a* may click a Facebook "like" button on the web page on which content element 104*a* appears. The Facebook server 120 may store a record of this "like" action within the user's Facebook account 120*a* (e.g., as record 122*b*) and/or within Company A's Facebook account 114*a*.
- If user 112*a* reads a description of one of Company A's products within content element 116*a* on Company A's Facebook page 114*a*, the user 112*a* may post a comment about the product on the Facebook page 114*a*. The Facebook server 120 may store a record of this comment within the user's Facebook account 120*a* (e.g., as record 122*c*) and/or within Company A's Facebook account 114*a*.
- If a company hosts an application within its Facebook page or on another online social networking system, the application may enable users to perform any of a variety of application-specific actions, such as voting in a contest. Such application-specific actions are also examples of "interactions" as that term is used herein.
- If a user purchases a product from Company A's web site 102*a* or Facebook page 114*a*, the profile server 130 may track such a purchase, such as by using a tracking pixel. The purchase may be recorded within the user's user-company profile. The purchase, therefore, is also an example of an "interaction" with Company A's content, as that term is used herein.
- A user's interaction with another user's user-company profile is also an example of an "interaction" as that term is used herein. For example, if user 120*b* views, shares, likes, or comments on user 120*a*'s user-company profile 134*a*, the profile server 130 may track such an interaction and store a record of it in user 112*a*'s profile 134*a* and/or in user 112*b*'s profile 134*b*.
- If a user visits a company's web site or Facebook page, the profile server 130 may identify the link that the user followed to arrive at the web site or Facebook page. Such following of a link is another example of an "interaction" that the profile server 130 may track and record in the user-company profile of the user who followed the link. As a particular example, if user 112*a* shares a link to Company A's web site 102*a* or Facebook page 114*a*, and user 112*b* follows that link, the profile server 130 may determine that the link was shared by user 112*a* and, as a result, the profile server 130 may record user 112*b*'s following of the link in user 112*a*'s user-company profile for Company A. As a result, the profile server 130 may track which users and the number of users that follow a particular link shared by another user.

The interactions listed above are merely examples. More generally, users 112*a-c* may interact with web sites 102*a-b* and Facebook pages 114*a-b* (and with content elements more generally) in any of a variety of ways, thereby causing Facebook server 120 to update the company Facebook pages 114*a-b* and/or the user Facebook pages 120*a-c* based on such interactions.

The system 100 of FIG. 1 also includes a profile server 130. In general, the profile server 130 maintains, for each user-company pair in the system 100, a profile representing the user's interactions with the company's content. For example, profile server 130 may create, store, and update profiles 132*a* associated with Company A and profiles 132*b* associated with Company B. Company A profiles 132*a* include a profile 134*a* that represents interactions between user 112*a* and Company A's content; a profile 134*b* that represents interactions between user 112*b* and Company A's content; and a profile 134*c* that represents interactions between user 112*c* and Company A's content. Similarly, Company B profiles 132*b* include a profile 136*a* that represents interactions between user 112*a* and Company B's content; a profile 136*b* that represents interactions between user 112*b* and Company B's content; and a profile 136*c* that represents interactions between user 112*c* and Company B's content.

Although each of the profiles 132*a-b* is described herein as representing interactions between a particular user and a particular company, this is merely one example and does not constitute a limitation of the present invention. Alternatively, for example, any one or more of the profiles 132*a-b* may represent interactions between a particular user and particular content elements, such as any of the content elements 104*a-c*, 106*a-c*, 116*a-b*, or 118*a-b*, or any other content element specified by a content element specification as defined herein. Therefore, any reference herein to interactions with a "company" or a "company's content" should be understood to refer more generally to interactions with a company and/or any one or more content elements associated with the company.

Furthermore, any one or more of the profiles 132*a-b* may represent interactions between a particular user account (such as an email account, Facebook account, or other online social networking account) and a company. For example, profile 134*a* may represent interactions between a first user account and Company A's content, profile 134*b* may represent interactions between a second user account and Company A's content, and profile 134*c* may represent interactions between a third user account and Company A's content. As a result, two or more of the profiles 134*a-c* may be associated with the same human user.

The profile that represents a particular user-company pair may represent interactions between that user and the company's content: (1) on the company's web site; and (2) on one or more of the company's online social networking accounts. For example, profile 134*a*, which represents interactions between user 112*a* and Company A's content, may represent: (1) interactions between user 112*a* and Company A's web site 102*a*; (2) interactions between user 112*a* and Company A's Facebook page 114*a*; and (3) interactions between user 112*a* and Company A's Twitter account (not shown in FIG. 1).

Figure 2:
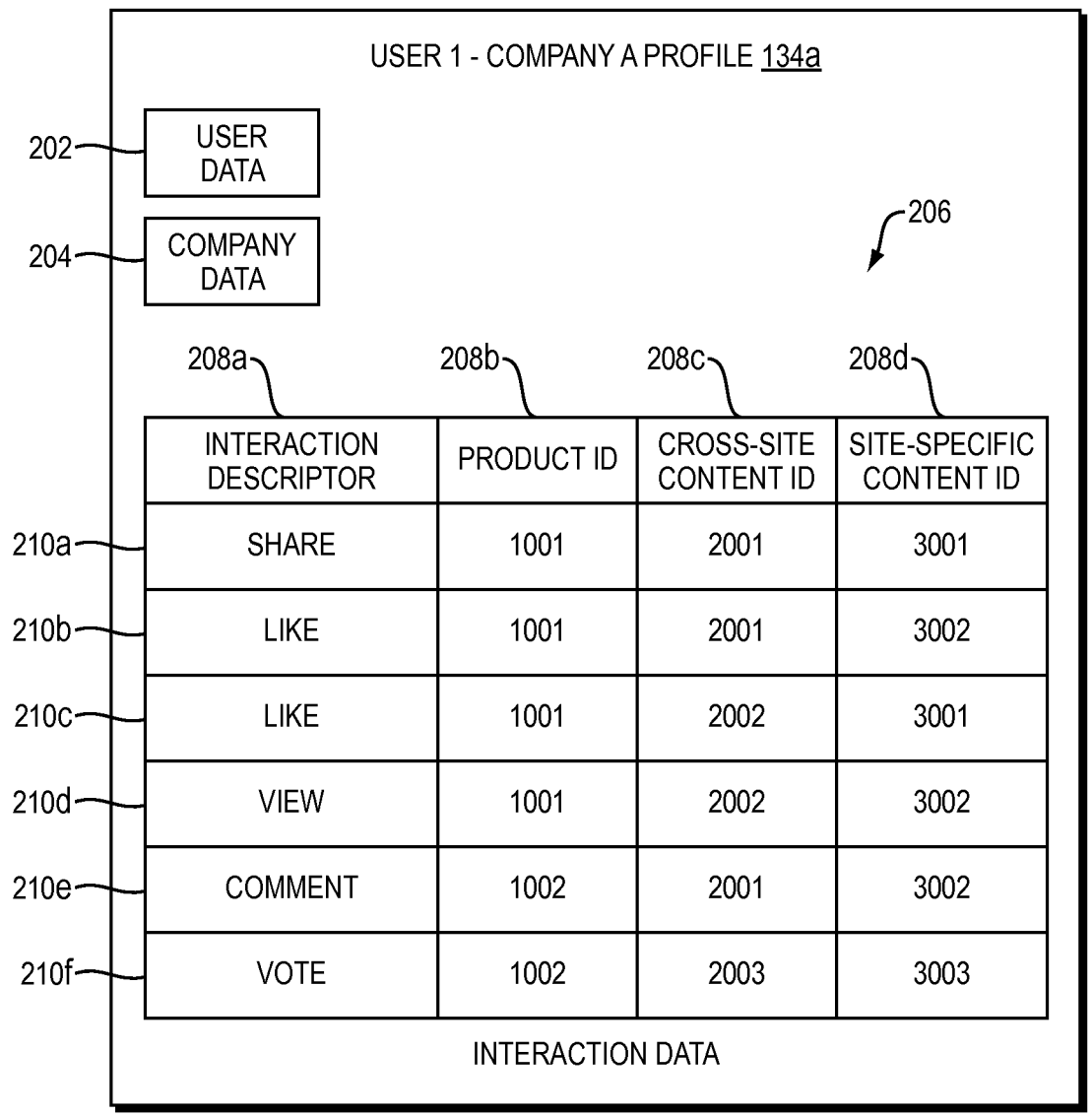
FIG. 2 is a diagram illustrating a data structure that may be used to store information representing interactions between a user and a company's content according to one embodiment of the present invention.

For example, referring to FIG. 2, a diagram is shown of the user-company profile 134*a* according to one embodiment of the present invention. The particular structure and content of profile 134*a* in FIG. 2 is shown merely for purposes of example and does not constitute a limitation of the present invention. Furthermore, other profiles 134*b-c* and 136*a-c*) may have structures that are the same as or similar to that shown in FIG. 2.

As shown in FIG. 2, profile 134*a* may include user data 202, which may identify the user (e.g., user 112*a*) associated with profile 134*a* in any of a variety of ways. For example, the user data 202 may include a unique identifier of the corresponding user, such as an email address or a unique identifier that is generated to distinguish all users within the system 100 from each other. The user data 202 may further include additional data related to the corresponding user, such as the user's real name, mailing address, telephone number, and payment information.

The profile 134*a* may include company data 204, which may identify the company associated with profile 134*a* in any of a variety of ways. For example, the company data 202 may include a unique identifier of the corresponding company, such as a domain name or a unique identifier that is generated to distinguish all companies within the system 100 from each other. The company data 204 may further include additional data related to the corresponding company, such as the company's name, mailing address telephone number, and other contact information.

The profile 134*a* may include interaction data 206, which may include data representing interactions of the user associated with profile 134*a* with content of the company associated with profile 134*a*. For ease of illustration, the interaction data 206 is shown in FIG. 2 as a table containing columns (fields) 208*a-d* and rows (records) 210*a-f*. More specifically, the interaction data 206 includes:

Interaction descriptor field 208*a* which contains, for each record in the data 206, data representing the type of interaction represented by the record and optionally additional information about the interaction.

Product identifier (ID) field 208*b* which contains, for each record in the data 206, data representing the product associated with the content element with which the user interacted in the interaction represented by the record.

Cross-site content identifier (ID) field 208*c* which contains, for each record in the data 206, data representing the cross-site content (e.g., cross-site advertisement) associated with the content element with which the user interacted in the interaction represented by the record.

Site-specific content identifier (ID) field 208*d* which contains, for each record in the data 206, data representing the site-specific content (e.g., advertisement on a particular web site) with which the user interacted in the interaction represented by the record.

The particular fields shown in the interaction data 206 in FIG. 2 are merely examples and do not constitute limitations of the present invention. The interaction data 206 may contain fields in addition to those shown in FIG. 2, and may omit fields shown in FIG. 2. Furthermore, certain fields may be empty within certain records in the interaction data 206. For example, any particular record may omit the contents of the product ID field 208*b* and/or the cross-site content ID field 208*c*.

In the example of FIG. 2, certain values are shown for product IDs (such as 1001 and 1002), cross-site content IDs (such as 2001, 2002, and 2003), and site-specific content IDs (such as 3001, 3002, and 3003). Such values are shown merely for ease of illustration and do not constitute limitations of the present invention. In practice, such values may take any form (such as URLs in the case of site-specific content IDs in column 208*d*).

Similarly, certain values are shown for interaction descriptors in column 208*a*, such as "Share," "Like," "View," "Comment," and "Vote." Such human-readable descriptors are shown merely for ease of illustration and do not constitute limitations of the present invention. In practice, such values may take any form, including non-human-readable forms. Furthermore, the interaction descriptor field 208*a* may contain data representing additional information about any particular interaction, such as the content of a comment or a vote.

In the example of FIG. 2:

record 210a represents a "share" interaction (column 208a) in which the corresponding user shared a content element associated with product ID 1001 (column 208b), cross-site content ID 2001 (column 208c), and site-specific content ID 3001 (column 208d);

record 210b represents a "like" interaction (column 208a) in which the corresponding user performed a Facebook "like" operation on a content element associated with product ID 1001 (column 208b), cross-site content ID 2001 (column 208c), and site-specific content ID 3002 (column 208d);

record 210c represents a "like" interaction (column 208a) in which the corresponding user performed a Facebook "like" operation on a content element associated with product ID 1001 (column 208b), cross-site content ID 2002 (column 208c), and site-specific content ID 3001 (column 208d);

record 210d represents a "view" interaction (column 208a) in which the corresponding user viewed a content element associated with product ID 1001 (column 208b), cross-site content ID 2002 (column 208c), and site-specific content ID 3002 (column 208d);

record 210e represents a "comment" interaction (column 208a) in which the corresponding user commented on a content element associated with product ID 1002 (column 208b), cross-site content ID 2001 (column 208c), and site-specific content ID 3002 (column 208d); and record 210f represents a "vote" interaction (column 208a) in which the corresponding user voted on a content element associated with product ID 1002 (column 208b), cross-site content ID 2003 (column 208c), and site-specific content ID 3003 (column 208d).

As the examples of FIG. 2 illustrate:

a particular product ID (e.g., product ID 1001) may be associated with a plurality of cross-site content IDs (e.g., cross-site content IDs 2001 and 2002), which reflects the fact that a particular product may be represented by the same content (e.g., advertisement) on multiple sites;

a particular product ID (e.g., product ID 1001) may be associated with a plurality of site-specific content IDs (e.g., site-specific content IDS 3001 and 3002), which reflects the fact that a particular product may be represented by the same or different content on multiple sites; and a particular cross-site content ID (e.g., cross-site content ID 2001) may be associated with a plurality of site-specific content IDs (e.g., site-specific content IDs 3001 and 3002), which reflects the fact that a particular content element (e.g., advertisement) may be contained in multiple sites.

Figure 3:
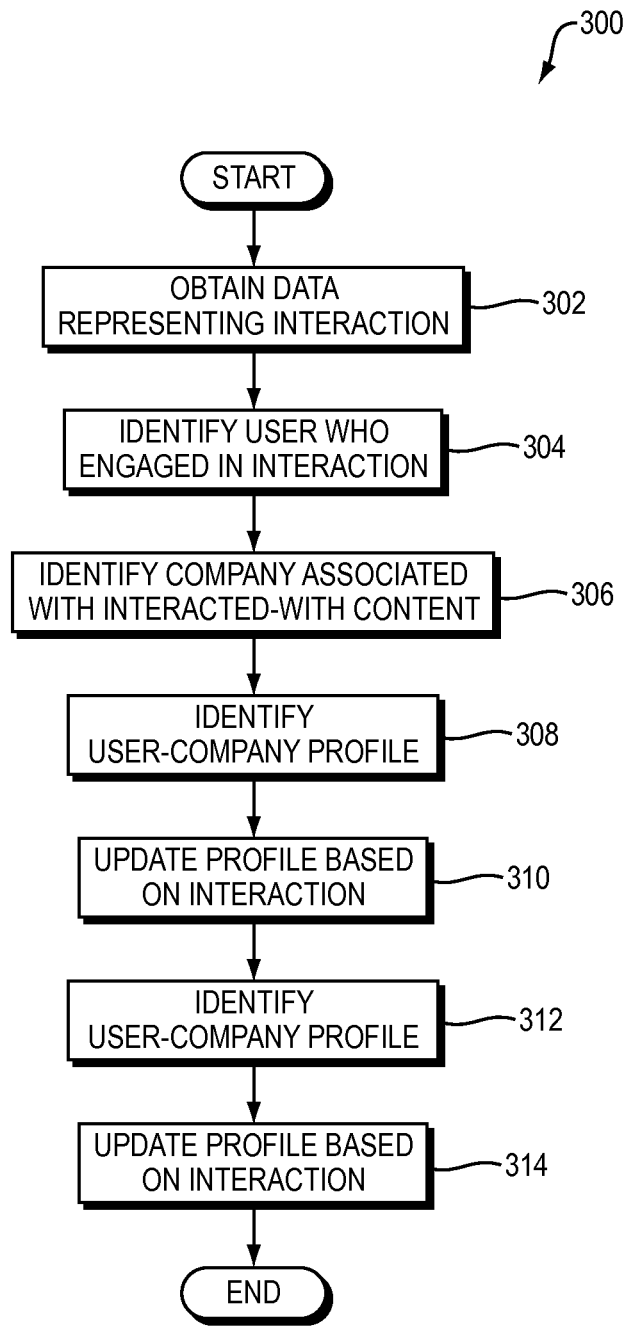
FIG. 3 is a flowchart of a method used by the system of FIG. 1 to track and measure user interaction with content according to one embodiment of the present invention.

Referring to FIG. 3, a flowchart is shown of a method 300 that is performed by the system 100 of FIG. 1 according to one embodiment of the present invention. Each time one of the users in the system 100 engages in any interaction with content in the system 100, the profile server 130 may:

(1) obtain data representing the interaction, such as data representing the type of interaction, as may be suitable for storage in the interaction descriptor field 208a in FIG. 2 (such as by obtaining such data from one of the web servers 108a-b or the Facebook server 120) (FIG. 3, operation 302);

(2) identify the user who performed the interaction (FIG. 3, operation 304);

(3) identify the company whose content was the subject of the interaction (FIG. 3, operation 306);

(4) identify the user-company profile corresponding to the user identified in (2) and the company identified in (3) (FIG. 3, operation 308); and (5) update the profile identified in (4) to reflect the interaction, based on the interaction data obtained in (1) (FIG. 3, operation 310).

More specifically, assume that one of the users 112a-c interacts with a particular content element. This user will be referred to as the "source user" and the content element with which the source user interacts will be referred to herein as the "interacted-with content". The interacted-with content may, for example, be any of the web site contents 104a-c or 106a-c, or any of the Facebook contents 116a-b or 118a-b. In response to the source user engaging in an interaction with the interacted-with content, the profile server 130 may identify and store in the corresponding user-company profile a record of the interaction, where the record may include any one or more of the following data elements:

the company ID of the company, if any, associated with (e.g., contained within) the interacted-with content;

the product ID of the product, if any, associated with (e.g., contained within) the interacted-with content;

the cross-site content ID, if any, associated with (e.g., contained within) the interacted with content;

the site-specific content ID (e.g., URL) associated with (e.g., contained within) the interacted-with content;

an identifier of a campaign associated with the interacted-with content;

metadata associated with the interacted-with content (such as any one or more of a title, description, thumbnail, and type of the interacted-with content);

some or all of the interacted-with content itself;

an identifier of the source user (such as an email address, real name, or Facebook account name);

identifiers of one or more other users with whom the source user shared the interacted-with content;

content attached by the source user to the interacted-with content, such as comments or images;

identifiers of one or more other users who have accessed the interacted-with content after the source user interacted with it; and data representing information about how other users have accessed the interacted-with content after the source user interacted with it.

The profile server 130 may store data about each interaction, such as the data listed above, within a separate record in the corresponding user-company profile, such as in records 210a-f of profile 134a (FIG. 2). As a result, after the profile server 130 has recorded multiple interactions in the profiles 132a-b, each such profile may contain multiple records of a particular user's interactions with a particular company's content. Furthermore, because each record may contain data specifying a particular product of the company (such as by referring to a particular web page or other content element associated with the product), the profiles 132a-b may contain data representing each of the users' 112a-c interactions with each of a plurality of products over time.

The profile server 130 may also store, within a particular user-company profile, information about the user associated with that profile, even if such information is not related to a particular interaction of the user with the company's content. Such information may be stored, for example, in the user data 202 (FIG. 2). Information about a user that may be stored in the user's user-company profile include, for example, the user's name, birthday, gender, residence address (or a portion thereof, such as the zip code of the user's residence address), and any additional information provided by the user, such as answer provided by the user to questions asked by the company to the user. Some or all of the information stored in a user's user-company profile may be obtained by the profile server 130 from the Facebook server 120, which may obtain the information from the user's Facebook profile. This is not required, however. A particular user's user-company profile may, for example, include information that is not contained with the user's Facebook profile.

In addition to or instead of storing such records of individual user interactions, the profile server 130 may calculate various metrics from the data gathered by the profile server 130 about user interactions (FIG. 3, operation 312). The profile server 130 may, for example, store such values within the profiles 132a-b themselves (FIG. 3, operation 314). Examples of values that the profile server 130 may derive include, but are not limited to:

(1) the number of times a particular user has engaged in any type of interaction with any content element(s) specified by a particular content element specification;

(2) the number of times a particular user has engaged in a specified type of interaction (e.g., sharing) with any content element(s) satisfying a particular content element specification;

(3) the number of times recipients of any content element(s) satisfying a particular content element specification have engaged in any type of interaction with such content element(s);

(4) the number of times recipients of any content element(s) satisfying a particular content element specification have engaged in a specified type of interaction (e.g., sharing) with such content element(s);

(5) the number of times recipients of any content element(s) associated with a particular company and shared by a particular user have engaged in any type of interaction with such content element(s); and (6) the number of times recipients of any content element(s) associated with a particular company and shared by a particular user have engaged in a specified type of interaction with such content element(s).

The metrics described in (1)-(6) above may be calculated using any of a variety of techniques. For example, (1) may be calculated by determining, for each record in each user-company profile associated with a particular user, whether the record is associated with a content element that is specified by a particular content element specification. A running sum of the number of matching content elements may be incremented each time a content element specified by the particular content element specification is found. The value of the sum after all records have been examined represents the number of times the user has engaged in any type of interaction with any content element(s) specified by the particular content element specification. The metrics described in (2)-(6) may be calculated using similar techniques that will be apparent to those having ordinary skill in the art.

As described above, a content element specification may specify, for example:

a particular content element (such as by specifying a particular URL or other unique identifier of the particular content element);

a cross-site content element (such as an advertisement or other content of which instances appear on multiple sites of the same company, such as the web site 102a and social networking site 114a);

a product-related content element (such as multiple advertisements for the same product, where each such advertisement may be a cross-site content element as that term is used herein); or a company-related content element (which may, for example, include all content elements, possibly across multiple products and/or sites, associated with a particular company specified by the content element specification).

For example, profile 134a, which represents interactions between user 112a and Company A's content, may store a value representing the number of times that user 112a has interacted with content element 104a on Company A's web site 102. The same profile 134a may also store a value representing the number of times that user 112a has interacted with content element 116a on Company A's Facebook page. As this example illustrates, the user profile 134a may contain both data about how a particular user (i.e., user 112a) has interacted with content on Company A's web site 102a and data about how the same user has interacted with content on Company A's Facebook page. This is one illustration of how profile 134a is an "integrated" user profile that spans activity on both Company A's web site 102a and on Company A's Facebook page 114a.

As another example, assume that content element 104a on Company A's web site and content element 116a on Company A's Facebook page are associated with the same advertisement of Company A. As a result, both content element 104a and content element 116a, when rendered, may produce the same or similar output as each other (such as the same or similar audio and/or video). In this case, profile 134a, which represents interactions between user 112a and Company A's content, may store a single value representing the aggregate number of times that user 112a has interacted with content element 104a and with content element 116b. In other words, if X is the number of interactions that user 112a has had with content element 104a, and Y is the number of interactions that user 112a has had with content element 116a, then the profile server 130 may calculate and store in profile 134a a single value representing X+Y, which is equal to the total number of interactions that user 112a has had with content associated with the same advertisement of Company A across Company A's web site 102a and Company A's Facebook page 114a. This is another illustration of how profile 134a is an "integrated" user profile that spans activity on both Company A's web site 102a and on Company A's Facebook page 114a.

Similarly, assume that content element 104a on Company A's web site and content element 116a on Company A's Facebook page are associated with the same product of Company A. In this case, profile 134a, which represents interactions between user 112a and Company A, may store a single value representing the aggregate number of times that user 112a has interacted with content element 104a and with content element 116b. In other words, if X is the number of interactions that user 112a has had with content element 104a, and Y is the number of interactions that user 112a has had with content element 116a, then the profile server 130 may calculate and store in profile 134a a single value representing X+Y, which is equal to the total number of interactions that user 112a has had with content associated with the same product of Company A across Company A's web site 102a and Company A's Facebook page 114a. This is another illustration of how profile 134a is an "integrated" user profile that spans activity on both Company A's web site 102a and on Company A's Facebook page 114a.

As yet another example, profile 134a may store a single value representing the aggregate number of interactions that user 112a has had with all of Company A's content, such as all of Company A's web site content element 104a-c, all of Company A's Facebook content element 116a-b, or all of Company A's content element 104a-c and 116a-b across both Company A's web site 102a and Facebook page 114a. In other words, if $X_1$ is the number of interactions that user 112a has had with web site content element 104a, $X_2$ is the number of interactions that user 112a has had with web site content element 104b, $X_3$ is the number of interactions that user 112a has had with web site content element 104c, $Y_1$ is the number of interactions that user 112a has had with Facebook content element 116a, and $Y_2$ is the number of interactions that user 112a has had with Facebook content element 116b, then profile server 130 may calculate and store in profile 134a a single value representing $X_1+X_2+X_3+Y_1+Y_2$, which is equal to the total number of interactions that user 112a has had with content associated with all of Company A's content across both Company A's web site 102a and Company A's Facebook page 114a. If Company A has pages (accounts) on other online social networking systems, then user 112a's interactions with content on those pages may also be reflected in the aggregate count of interactions in profile 134a. This is yet another illustration of how profile 134a is an "integrated" user profile that spans activity on both Company A's web site 102a and on Company A's Facebook page 114a.

Embodiments of the present invention may calculate and store values other than sums of interactions of users with a particular content element. More generally, embodiments of the present invention may calculate any function of a user's interactions with a particular content element. For example, embodiments of the present invention may record both: (1) the number of times X a particular user has been exposed to content elements in a particular content category; and (2) the number of times Y the user interacted with such content. Embodiments of the present invention may calculate and store X/Y, which represents the percentage of times in which the user interacted with content in the particular content category. This is merely one example of a function that embodiments of the present invention may apply to interactions of users with content.

The data in the profiles 134a-c may be used for a variety of purposes. For example, the data in profile 132a may be used to identify:

which of the users 112a-c has had the largest number of interactions with Company A's content in aggregate;
which of the users 112a-c has had the largest number of interactions with a particular content element associated with Company A (e.g., content element 104a);
an ordered or unordered list of N users who are most engaged with Company A's content (e.g., in aggregate, or with respect to any particular content element), where N may be any number.

Embodiments of the present invention may be used to display or otherwise provide output representing any of the above, such as on Company A's web site 102a or Facebook page 114a. For example, a list of the users who are most engaged with Company A's content may be automatically generated and updated, and displayed on Company A's Facebook page 114a.

More generally, embodiments of the present invention may display output representing some or all of any of the user-company profiles 132a-b. For example, Company A may display the names of users associated with profiles 134a-c (or a subset thereof) on Company A's web site 102a and/or Facebook page 114a. Such a display may include a display of information from the user's user-company profile that is not contained within the user's Facebook profile.

It should be clear from the description above that the profiles 132a-b provide their respective companies with a variety of information about the users associated with the profiles 132a-b. For example, the profiles 134a-c associated with Company A contain data representing information about every user who has interacted with Company A's content (e.g., Company A's web site content element 104a-c and Facebook content element 116a-b), including data representing information about every user who has liked, shared, and commented on Company A's content. Providing Company A with access to the profiles 132a therefore enables Company A to determine which of the users 112a-c are most engaged with Company A's content. One measure of a user's level of engagement with Company A's content is the degree to which the user shares Company A's content with other users. Such a measure may easily be identified based on data in the user's profile.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The description herein refers to certain online social networking systems, such as Facebook and Twitter, merely for purposes of example. Embodiments of the present invention are not limited to use in conjunction with these particular online social networking systems, but instead may be used in conjunction with any one or more online social networking systems. More generally, embodiments of the present invention may be used in conjunction with any online system for hosting content, such as any web site. Therefore, any reference herein to an "online social networking system" should be understood to refer more generally to any online system for hosting content, whether or not such a system includes social networking features.

Any reference herein to a "product" should be understood to refer to a product and/or a service. Similarly, any reference herein to a "service" should be understood to refer to a product and/or a service.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by a computer processor executing computer program instructions stored on a non-transitory computer-readable medium, the method comprising:
   (A) identifying a first interaction by a first user with a first content element on a first web site associated with a first entity, wherein the first content element is specified by a first content element specification, wherein the first content element specification includes a unique cross-site identifier;
   (B) identifying a second interaction by the first user with a second content element on a first social networking site associated with the first entity, wherein the second content element is specified by the first content element specification;
   (C) storing, in a profile associated with the first user and the first entity, a first record of the first interaction and a second record of the second interaction, wherein the first record includes the unique cross-site identifier and wherein the second record includes the unique cross-site identifier; and
   (D) calculating a metric based on the first record and the second record, wherein the metric includes data representing a sum of a number of interactions of the first user with the first content element and a number of interactions of the first user with the second content element.

2. The method of claim 1, further comprising:
   (D) identifying a third interaction by the first user with a third content element on a second social networking site associated with the first entity; and
   (E) storing, in the profile associated with the first user and the first entity, a record of the third interaction.

3. The method of claim 1:
   wherein the first content element is associated with a first product of the first entity;
   wherein the second content element is associated with the first product of the first entity;
   wherein (C) comprises storing, in the first record, an identifier of the first product; and
   wherein (D) comprises storing, in the second record, the identifier of the first product.

4. The method of claim 1:
   wherein the first content element comprises a first instance of a first advertisement;
   wherein the second content element comprises a second instance of the first advertisement; and
   wherein the identifier associated with the first content element specification is a cross-site content identifier associated with the first advertisement.

5. The method of claim 1, wherein the first interaction comprises selection of the first content element by the first user.

6. The method of claim 1, wherein the first web site is served by a first server and wherein the first social networking site is served by a second server.

7. The method of claim 1, wherein the first web site is accessible at a first network address and wherein the first social networking site is accessible at a second network address.

8. The method of claim 1, wherein the first web site is accessible programmatically via a first application program interface and wherein the first social networking site is accessible programmatically via a second application program interface.

9. The method of claim 1, wherein the first interaction comprises sharing of the first content element by the first user with a second user.

10. The method of claim 1, wherein the second interaction comprises sharing of the second content element by the first user with a second user.

11. The method of claim 1, wherein the first interaction comprises endorsement of the first content element by the first user.

12. The method of claim 1, wherein the second interaction comprises endorsement of the second content element by the first user.

13. The method of claim 1, wherein the first interaction comprises posting a comment about the first content element by the first user to the first web site.

14. The method of claim 1, wherein the second interaction comprises posting a comment about the second content element by the first user to the first social networking site.

15. The method of claim 1, further comprising:
   (E) storing data representing the metric in the profile associated with the first user and the first entity.

16. A non-transitory computer-readable medium comprising computer program instructions executable by a computer processor to perform a method comprising:
   (A) identifying a first interaction by a first user with a first content element on a first web site associated with a first entity, wherein the first content element is specified by a first content element specification, wherein the first content element specification includes a unique cross-site identifier;
   (B) identifying a second interaction by the first user with a second content element on a first social networking site associated with the first entity, wherein the second content element is specified by the first content element specification;

(C) storing, in a profile associated with the first user and the first entity, a first record of the first interaction and a second record of the second interaction, wherein the first record includes the unique cross-site identifier and wherein the second record includes the unique cross-site identifier;

(D) calculating a metric based on the first record and the second record, wherein the metric includes data representing a sum of a number of interactions of the first user with the first content element and a number of interactions of the first user with the second content element.

17. The computer-readable medium of claim 16, further comprising:
(D) identifying a third interaction by the first user with a third content element on a second social networking site associated with the first entity; and
(E) storing, in the profile associated with the first user and the first entity, a record of the third interaction.

18. The computer-readable medium of claim 16:
wherein the first content element is associated with a first product of the first entity;
wherein the second content element is associated with the first product of the first entity;
wherein (C) comprises storing, in the first record, an identifier of the first product; and
wherein (D) comprises storing, in the second record, the identifier of the first product.

19. The computer-readable medium of claim 16:
wherein the first content element comprises a first instance of a first advertisement;
wherein the second content element comprises a second instance of the first advertisement; and
wherein the identifier associated with the first content element specification is a cross-site content identifier associated with the first advertisement.

20. The computer-readable medium of claim 16, wherein the first interaction comprises selection of the first content element by the first user.

21. The computer-readable medium of claim 16, wherein the first web site is served by a first server and wherein the first social networking site is served by a second server.

22. The computer-readable medium of claim 16, wherein the first web site is accessible at a first network address and wherein the first social networking site is accessible at a second network address.

23. The computer-readable medium of claim 16, wherein the first web site is accessible programmatically via a first application program interface and wherein the first social networking site is accessible programmatically via a second application program interface.

24. The computer-readable medium of claim 16, wherein the first interaction comprises sharing of the first content element by the first user with a second user.

25. The computer-readable medium of claim 16, wherein the second interaction comprises sharing of the second content element by the first user with a second user.

26. The computer-readable medium of claim 16, wherein the first interaction comprises endorsement of the first content element by the first user.

27. The computer-readable medium of claim 16, wherein the second interaction comprises endorsement of the second content element by the first user.

28. The computer-readable medium of claim 16, wherein the first interaction comprises posting a comment about the first content element by the first user to the first web site.

29. The computer-readable medium of claim 16, wherein the second interaction comprises posting a comment about the second content element by the first user to the first social networking site.

30. The computer-readable medium of claim 16, further comprising:
(E) storing data representing the metric in the profile associated with the first user and the first entity.

31. A method performed by a computer processor executing computer program instructions stored on a non-transitory computer-readable medium, the method comprising:
(A) identifying a first interaction by a first user with a first content element on a first social networking site associated with a first entity, wherein the first content element is specified by a first content element specification, wherein the first content element specification includes a unique cross-site identifier;
(B) identifying a second interaction by the first user with a second content element on a second social networking site associated with the first entity, wherein the second content element is specified by the first content element specification;
(C) storing, in a profile associated with the first user and the first entity, a first record of the first interaction and a second record of the second interaction, wherein the first record includes the unique cross-site identifier and wherein the second record includes the unique cross-site identifier; and
(D) calculating a metric based on the first record and the second record, wherein the metric includes data representing a sum of a number of interactions of the first user with the first content element and a number of interactions of the first user with the second content element.

32. A non-transitory computer-readable medium comprising computer program instructions executable by a computer processor to perform a method comprising:
(A) identifying a first interaction by a first user with a first content element on a first social networking site associated with a first entity, wherein the first content element is specified by a first content element specification, wherein the first content element specification includes a unique cross-site identifier;
(B) identifying a second interaction by the first user with a second content element on a second social networking site associated with the first entity, wherein the second content element is specified by the first content element specification;
(C) storing, in a profile associated with the first user and the first entity, a first record of the first interaction and a second record of the second interaction, wherein the first record includes the unique cross-site identifier and wherein the second record includes the unique cross-site identifier; and
(D) calculating a metric based on the first record and the second record, wherein the metric includes data representing a sum of a number of interactions of the first user with the first content element and a number of interactions of the first user with the second content element.

33. A method performed by a computer processor executing computer program instructions stored on a non-transitory computer-readable medium, the method comprising:
(A) identifying a first interaction by a first user with an online content element on a first web site associated with a first entity, wherein the online content element is specified by a first content element specification, wherein the first content element specification includes a unique cross-site identifier;

(B) identifying a second interaction by the first user with an offline content element associated with the first entity, wherein the offline content element is specified by the first content element specification;

(C) storing, in a profile associated with the first user and the first entity, a first record of the first interaction and a second record of the second interaction, wherein the first record includes the unique cross-site identifier and wherein the second record includes the unique cross-site identifier; and (D) calculating a metric based on the first record and the second record, wherein the metric includes data representing a sum of a number of interactions of the first user with the first content element and a number of interactions of the first user with the second content element.

34. A non-transitory computer-readable medium comprising computer program instructions executable by a computer processor to perform a method comprising:

(A) identifying a first interaction by a first user with an online content element on a first web site associated with a first entity, wherein the online content element is specified by a first content element specification, wherein the first content element specification includes a unique cross-site identifier;

(B) identifying a second interaction by the first user with an offline content element associated with the first entity, wherein the offline content element is specified by the first content element specification;

(C) storing, in a profile associated with the first user and the first entity, a first record of the first interaction and a second record of the second interaction, wherein the first record includes the unique cross-site identifier and wherein the second record includes the unique cross-site identifier; and (D) calculating a metric based on the first record and the second record, wherein the metric includes data representing a sum of a number of interactions of the first user with the first content element and a number of interactions of the first user with the second content element.

* * * * *

UNITED STATES PATENT AND TRADEMARK OFFICE
CERTIFICATE OF CORRECTION

| | | |
|---|---|---|
| PATENT NO. | : 9,081,468 B2 | Page 1 of 1 |
| APPLICATION NO. | : 13/684273 | |
| DATED | : July 14, 2015 | |
| INVENTOR(S) | : Lansford et al. | |

It is certified that error appears in the above-identified patent and that said Letters Patent is hereby corrected as shown below:

On the Title Page, item (56), References Cited under "OTHER PUBLICATIONS", in Column 2, Line 1, delete "Huyperlinks" and insert -- Hyperlinks --, therefor.

In the specification

In Column 7, Line 47, delete "FIG. 100," and insert -- FIG. 1, --, therefor.

In Column 10, Line 8, delete "company data 202" and insert -- company data 204 --, therefor.

Signed and Sealed this
Twenty-fourth Day of November, 2015

Michelle K. Lee
*Director of the United States Patent and Trademark Office*